Feb. 4, 1936.         W. L. WETTLAUFER         2,029,848
                         VIBRATING SCREEN
                        Filed Nov. 30, 1932          4 Sheets-Sheet 1

INVENTOR
William L. Wettlaufer
BY
Popp and Powers
ATTORNEYS

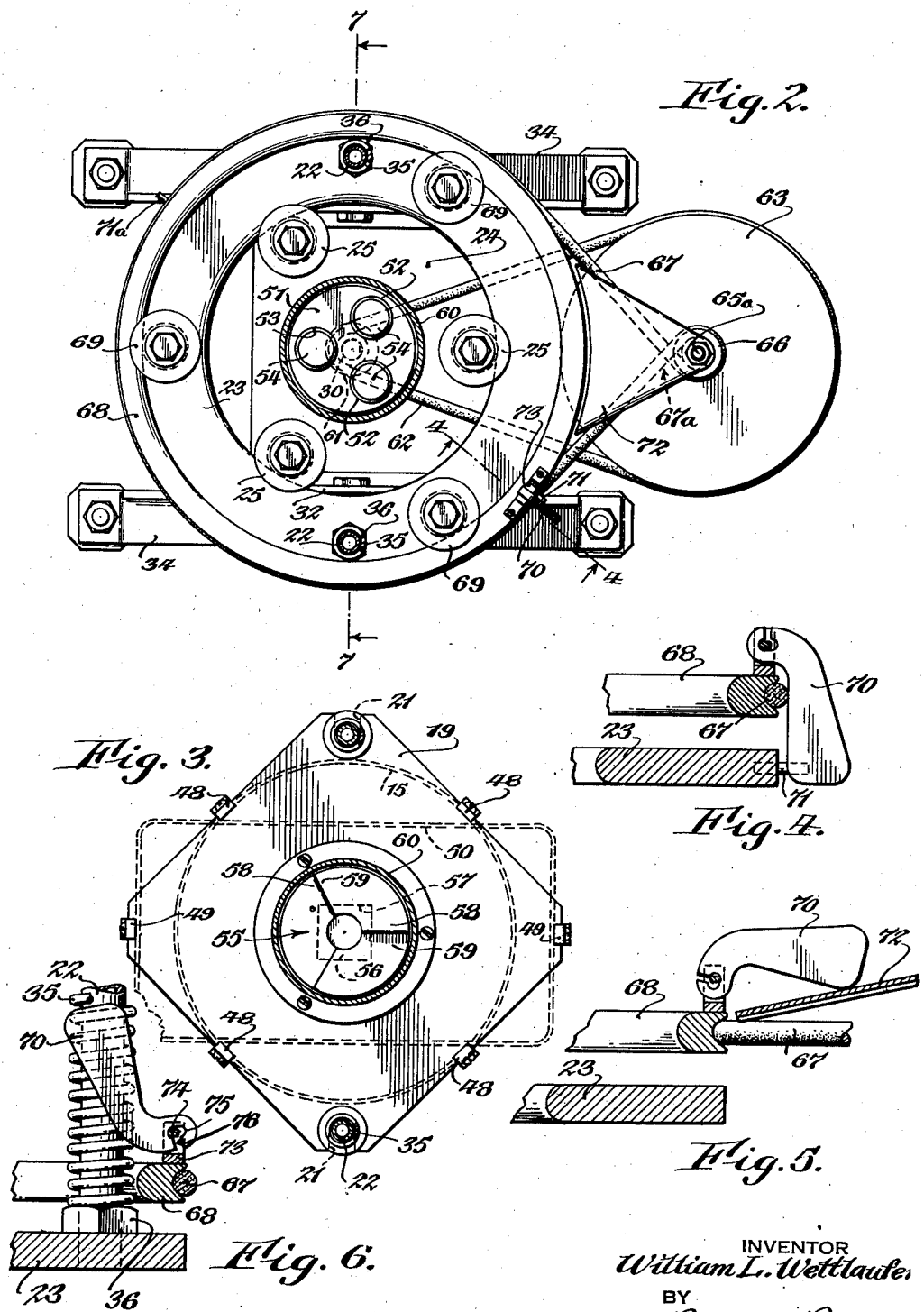

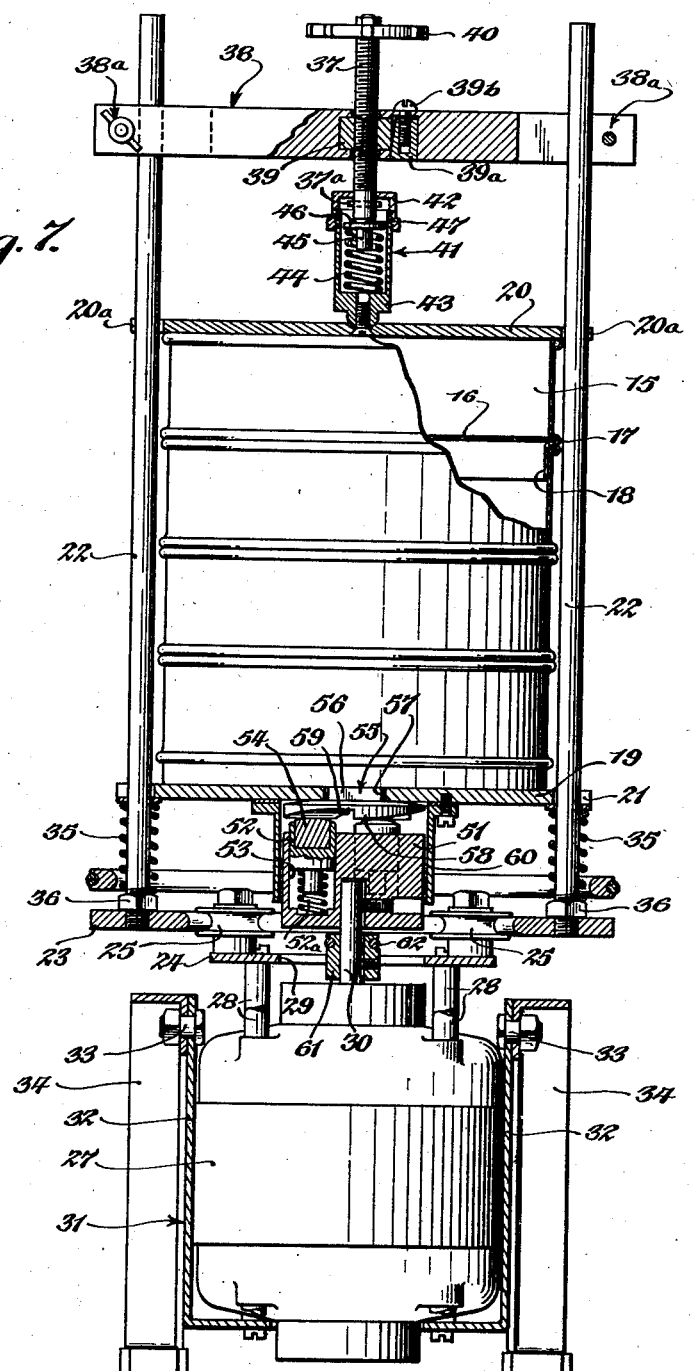

Feb. 4, 1936.   W. L. WETTLAUFER   2,029,848
VIBRATING SCREEN
Filed Nov. 30, 1932   4 Sheets-Sheet 4

INVENTOR
William L. Wettlaufer
BY
Popp and Powers
ATTORNEYS

Patented Feb. 4, 1936

2,029,848

UNITED STATES PATENT OFFICE 2,029,848

VIBRATING SCREEN

William L. Wettlaufer, Buffalo, N. Y., assignor to The W. S. Tyler Company, Cleveland, Ohio, a corporation of Ohio Application November 30, 1932, Serial No. 645,015

2 Claims. (Cl. 209—237)

This invention relates to apparatus for grading materials and more particularly the invention is concerned with improvements in apparatus of the kind generally described in which the grading of the materials is effected by vibrating screens.

One object of the invention is to provide apparatus in which the intensity of the screen vibrations may be regulated at will.

A further object is to provide apparatus wherein the material is maintained in a state of uniform distribution over the screening surfaces.

A still further object is to provide apparatus in which the material is caused to move continuously over the screening surfaces in such a manner as to prevent its accumulation at any particular point.

A still further object is to provide apparatus which is so designed that the movement of the material over the screening surfaces may be controlled.

A still further object is to provide a novel mechanism for vibrating the screening surfaces.

A still further object is to provide a novel arrangement of the parts of the apparatus, whereby a simple and economical construction is obtained.

The invention is illustrated in the accompanying drawings, in which:

Figure 2 is a section taken along line 2—2 of Figure 1.

Figure 3 is a section taken along line 3—3 of Figure 1.

Figure 4 is an enlarged fragmentary section of the clutch mechanism and is taken along line 4—4 of Figure 2, the mechanism being shown in one of its operative positions.

Figure 5 is a similar view of the clutch mechanism showing the relation of the parts at a point in advance of the position shown in Figure 4.

Figure 6 is an enlarged fragmentary section of the clutch mechanism, the said mechanism being shown in a second operative position.

Figure 7 is a vertical section through the apparatus and is taken along line 7—7 of Figure 2.

Figure 1:
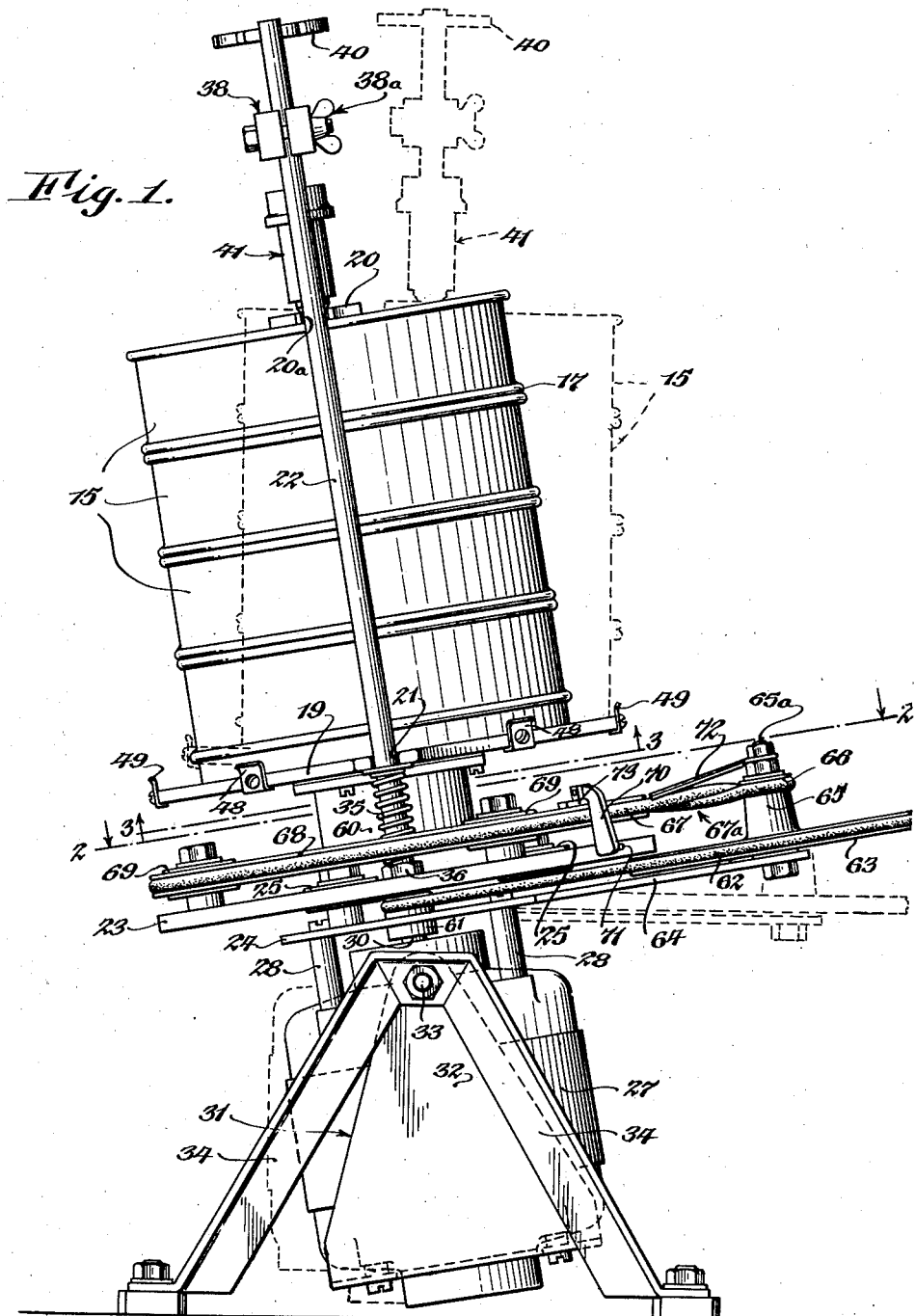
Figure 1 is a side elevation of apparatus in which features of the invention are incorporated.

The invention is illustrated in connection with a machine which is designed primarily for testing purposes. It is to be understood, however, that this is solely by way of illustration as the features of the invention are equally applicable to industrial apparatus of regulation capacity.

The apparatus, as illustrated, includes a plurality of superposed screen boxes 15 which may be of any suitable construction. Each of the said boxes, as illustrated, includes a screen cloth 16. The cloth is secured by its margins in a channel-shaped groove which is provided by a bead 17 (Figure 7), the bead being suitably formed in the side walls of the box. The lower margin 18 of the side walls of each box is adapted to fit in the mouth of the box below, the bead 17 forming a shoulder by which an upper box is supported upon a lower box. The boxes 15 are arranged as a unit upon a plate 19 and are secured thereon by a cross bar 20. The plate 19 is notched at opposite sides as at 21 to accommodate a pair of rods 22 which are arranged at opposite sides of the boxes 15, and which comprise a portion of the framework in which the screen boxes are carried. The rods 22 are carried by a flat ring 23 which is supported upon a plate 24 by pulleys 25. The plate 24 is carried by the housing of an electric motor 27, the plate being supported from the housing by posts 28 and being formed with an opening 29 through which the drive shaft 30 of the motor extends. The motor 27 is suitably secured in a hanger 31 which is formed with arms 32, the latter being arranged at opposite sides of the motor and being suspended from shafts 33 between the frame members 34 of a supporting structure. As the hanger 31 is pivotally mounted in the supporting structure, the motor 27 and hence the screen bearing frame carried thereby may be arranged at the angle desired. The motor 27 may be utilized to counterbalance the weight of the screen bearing frame, whereby to hold the said frame in any position to which it may be adjusted.

The plate 19 is supported upon coil springs 35. The latter are arranged over the rods 22 between the plate 19 and nuts 36 which are carried by the said rods. It will be apparent, therefore, that the plate 19 and screen boxes 15 are yieldingly supported upon the springs 35. The cross bar 20 is suspended from a cross head 38 by a threaded rod 37, the said cross head being arranged between the rods 22 and being adjustably secured thereto by suitable fastening means 38a. The rod 37 is adjustably mounted in a split nut 39 which is carried by the cross head 38. Adjustment of the rod 37 in the said nut may be effected by a hand wheel 40 and the said rod may be locked in its adjusted position by a tapered element 39a which is carried by a screw 39b. The said element may be adjusted to wedge the two halves of the nut 39 against the rod 37 and hold it against further movement. The rod 37 is connected to the cross bar 20 by a housing 41 which includes upper and lower sections 42 and 43 respectively. The said rod extends into the housing 41 and the reduced end 45 thereof carries a washer 46. The latter is arranged upon the reduced end of the rod between a shoulder 47 and a spring 44. The housing 41 is secured upon the rod 37 by a cross pin 37a. The hand wheel 40 may be adjusted to raise and lower the bar 20, the said bar being suitably notched at its ends as at 20a, whereby it may be adjusted up and down upon the rods 22 in the manner described. When the bar 20 is raised the screen boxes may be arranged upon the plate 19. Thereafter the hand wheel 40 may be operated to lower the bar 20 upon the screen boxes. Further movement of the hand wheel 40 in the same direction causes the spring 44 to be compressed. As the said bar is urged against the topmost of the screen boxes by the spring 44 the pressure which is applied to the bar 20 is transmitted to the boxes and the latter are forced downwardly against the action of the springs 35. The plate 19, as best shown in Figure 3 carries a plurality of upwardly projecting elements 48 and 49. The former are arranged to engage the screen boxes 15 and prevent their lateral movement upon the plate 19. In the various embodiments of the invention illustrated the screen boxes 15 are cylindrical in shape and the elements 48 therefor are arranged to co-operate with screen boxes of this shape. The invention also contemplates the use of screen boxes of rectangular shape. The elements 49, therefore, are arranged to co-operate with the elements 48 in order to condition the apparatus so that rectangular boxes may be secured upon the plate 19, such a box being indicated in dotted lines at 50 in Figure 3.

Means is provided whereby the boxes 15 may be vibrated in order to facilitate the grading of the material. To this end the shaft 30 of the motor 27 carries a rotor 51. Spring loaded elements 52 are arranged in a circular series of chambers 53 which are formed in the said rotor. The elements 52, as illustrated in Figure 7, carry inserts 54 which preferably are of maple or a similar hard wood and which have been soaked in oil. The elements 52 co-operate with a member 55 which is held against the underside of the plate 19. The said member 55 is provided with a squared end 56 which fits in an opening 57 formed in the plate 19, whereby it is held against rotation. The member 55 is formed with ratchet-like elevations and depressions 58 and 59, respectively, with which the elements 52 co-operate.

The plate 19 is supported by the springs 35 in such relation to the elements 52 that the latter are urged against the member 55 by their springs 52a. Upon energization of the motor 27 the rotor 51 is preferably caused to rotate at a relatively high speed, a speed for example of the order of 1200 R. P. M. As the rotor 51 rotates the elements 52 ride up the elevations of the member 55 and then under the influence of their springs are caused to strike the depressions of the member 55 with considerable force when they pass beyond the elevations. Hence, assuming a motor speed of 1200 R. P. M., then 3600 impulses will be imparted to the member 55 and hence to the screen boxes carried by the plate 19 when, as illustrated, the rotor carries three of the elements 52 and there is a companion elevation and depression for each of the said elements. Each impulse causes the member 19 and screen boxes 15 carried thereby to move upwardly against the action of the cross bar 20 which, owing to the spring 44, tends to counteract such movement. These impulses tend to throw the material above the screening surfaces of the boxes 15, the severity of such action and the height to which the material is thrown, when it is thrown, depending upon the intensity of the impulses. It will be apparent that the intensity of the vibrating impulses may be controlled by adjustment of the cross bar 20. The intensity of the vibrations of the screen boxes may be increased by adjusting the hand wheel 40 to increase the pressure with which the bar 20 bears against the screen boxes. In response to such increased pressure the plate 19 and member 55 move downwardly against the action of the springs 35 thereby compressing the element actuating springs 52a. Hence, the latter cause the elements 52 to strike the member 55 with a correspondingly greater force thereby increasing the intensity of the impulses imparted to the screen boxes. In order to lessen the intensity of the impulses the hand wheel 40 may be adjusted to decrease the pressure with which the cross bar 20 bears against the screen boxes, whereby to permit the plate 19 and element 55 to move upwardly with respect to the rotor 51. It will be apparent, therefore, that by varying the pressure of the cross bar 20 upon the screen boxes the intensity of the vibrations of the latter may be regulated to meet the particular conditions which are presented. The number of elements 52 may be varied if desired, the number illustrated being by way of example only. In order to enclose the vibrating mechanism the plate 19 preferably carries a sleeve 60 which fits over the rotor 51. The use of the oil soaked inserts 54 in the manner described is preferred as it enables a more quiet operation of the apparatus than can be obtained if the elements 52 are of an all metal construction. A further advantage is that wearing of the parts is maintained at a minimum, the absorbed oil in the inserts serving to lubricate the contacting surfaces. The inserts have long wearing characteristics but can be readily replaced when their wearing has progressed to an objectionable extent.

The motor shaft 30 carries a drive pulley 61 which is connected by a belt 62, to a reducing pulley 63, the latter being carried by a laterally extending arm 64 (Figure 1) of the plate 24. The pulley 63 is formed or provided with a hub-like extension 65 by which it is mounted upon a stub shaft 65a. The said extension is formed with a pulley groove 66. A belt 67 fits in the latter and connects the pulley 63 to a pulley 68 which is supported upon the ring 23 by pulleys 69 which are mounted on the said ring. The pulley 68, therefore, is adapted to be rotated by the motor 27 through the reducing pulley 63. During the operation of the vibrating mechanism the operation of the rotor 51 tends to rotate the screen boxes in an anti-clockwise direction. The belt 67, therefore, which connects the pulleys 63 and 68 is preferably twisted as at 67a, whereby the latter is rotated in a clockwise direction. The tendency, therefore, of the screen boxes to rotate in one direction as a result of the rotation of the rotor 51 in that direction is counteracted by the tendency of the pulley 68 to rotate the boxes in the opposite direction. Hence, if desired, the screen boxes may be vibrated in the manner described while they remain stationary insofar as angular movement is concerned.

It will be apparent from the foregoing that during the operation of the vibrating mechanism the pulley 68 is caused to rotate continuously, it being noted that the speed at which the said ring rotates is relatively slow owing to its connection to the motor by the reducing pulley 63. To the end that the screen boxes, if desired, may be caused to rotate continuously by the pulley 68 the latter, as best shown in Figure 6, carries a clutch element 70. The said element may be moved to the position shown, in which position it engages one of the posts 22 or the spring 35 which is arranged around the post. With the parts arranged in this position rotation of the pulley 68 causes the screen bearing frame to rotate with it. In other words, as the clutch element 70 engages a post 22 it causes the ring 23 to rotate. Thus the screen boxes may be rotated and vibrated simultaneously, the rotation of the boxes in the manner described facilitating the distribution of the material over the screening surfaces.

Means is provided whereby the continuous rotation of the pulley 68 may be utilized to cause intermittent rotation of the screen boxes. To this end the ring 23 carries diametrically opposed pins 71 and 71a (Figures 2 and 4). In order to effect intermittent rotation of the screen boxes the clutch element 70 is moved to the position shown in Figure 4 in which position it engages the pin 71. The clutch element 70 is adapted to engage the latter through substantially one half of a revolution, during which time the screen boxes are caused to rotate through the same angular distance. As the pulley 68 reaches the limit of the half revolution it approaches a deflector 72 which is carried by the stub shaft 65a. The deflector overlies the twisted portions 67a of the belt. As the clutch element 70 approaches the deflector 72 the free end thereof is engaged by that portion of the belt which is moving away from the pulley 68 toward the pulley groove 66, whereby the free end of the element is pivoted outwardly beyond the end of the element 71. The driving connection, therefore, between the pulley 68 and the ring 23 is broken. As the clutch element 70 is disengaged from the pin 71 in the manner described it moves upwardly upon the deflector 72 (Figure 5) and is held in this position until it passes the intersection of the twisted portion of the belt. When the clutch element passes beyond the deflector 72, the free end thereof falls by gravity to its down, or operative, position. From the time that the element 70 returns to this position until it engages the pin 71a which is diametrically opposite the pin 71 the pulley 68 is disconnected from the ring 23. Hence, during such time the screen boxes remain stationary. Upon engagement of the clutch element 70 with the pin 71a the screen boxes are again moved through an angle of substantially 180 degrees in the manner described.

It will thus be apparent that the clutch element 70 is operative in its full up position to effect continuous rotation of the screen boxes while it is operative in its full down position to effect intermittent rotation of the screen boxes. In order to render the clutch element 70 operative so that the screen boxes may be vibrated while they are stationary insofar as angular movement is concerned means is provided whereby the said element may be readily detached from the pulley 68. To this end it is secured to the pulley by a bracket 73. The latter carries a flat pin 74 which is adapted to fit in an opening 75 formed in one end of the element. Access to the opening 75 is had through a slot 76. The clutch element may be secured to the pulley ring 68 by holding it in such a manner that the walls of the slot 76 are substantially parallel with the flat sides of the pin 74. When the parts are arranged in this position the pin 74 may be caused to enter the opening 75 and in this position the clutch element 70 may be manipulated in the manner described.

From the foregoing it will be appreciated that the screen bearing frame is pivotally supported as a unit between the members 34 of the supporting structure. In the operation of the machine it is preferred that the screen boxes be arranged at an angle with respect to the vertical, for example, at the angle shown in Figure 1. When the boxes are arranged in this manner the inclination of the screening surfaces in conjunction with the vibratory movements of the screen boxes tends to cause the material to flow over the screening surfaces in the direction that the screen boxes incline. In other words, the tendency of the material is to flow from the high sides of the screen boxes toward the low sides thereof. However, as the latter rotate they tend to carry the material with them in the direction of rotation. Hence when the screen boxes are arranged at an angle the inclination of the screening surfaces in conjunction with the vibratory movements to which the screening surfaces are subjected tends to cause the material to flow from the high sides of the screens toward their low sides, while at the same time the rotary movement of the screens tends to carry the material in circular paths. Therefore, when the screen boxes are rotating the tendency of that portion of the material which is being carried from the low sides to the high side of the boxes to flow toward the low sides thereof is counteracted, while the tendency of the material which is being carried from the high sides of the boxes to the low sides thereof to flow toward the low sides of the boxes is increased by the rotary movement of the screen boxes. The latter are preferably adjusted at such an angle that the rotary movement of the screen boxes causes the material to move in continuous paths despite the counteracting effects of the factors described. Thus the material is caused to distribute itself uniformly over the screening surfaces of the boxes and such uniformity of distribution is maintained during the operation of the apparatus without substantial accumulation of the material in the low sides of the boxes. Grading or separation of the material into its desired components is, therefore, facilitated.

Intermittent rotation of the screen boxes in the manner described has the advantage that during pauses the material in the high sides of the boxes is caused to move, as a result of the inclination of the boxes and the vibratory movements to which they are subjected, toward the low sides of the boxes. The apparatus is so designed that when a substantial part of the material accumulates in the low sides of the boxes the latter are rotated a half revolution before again pausing. During this movement the low sides of the boxes are elevated while the high sides thereof are lowered, whereby to elevate those sides of the boxes in which the material has accumulated. Hence during the subsequent pause the accumulated material flows across the screening surfaces toward the low side of the boxes in the manner described. This mode of operation is particularly desirable when the screen boxes are of an elongated construction as, for example, of the rectangular construction shown in dotted lines in Figure 3. When boxes of this type are employed the apparatus is so adjusted that during pauses of the boxes the latter are inclined in the direction of their length. Hence during a pause the material, owing to the inclination of the screens and the vibratory action to which they are subjected, moves across the entire length of the screens into the low side of the boxes, after which operation the boxes are rotated through an angle of 180 degrees to again elevate the material.

From the foregoing it will be apparent that the material during the screening operations is caused to move continuously over large areas of the screening surfaces while being maintained in a violently agitated condition. Grading of the material is, therefore, facilitated while blinding of the screening surfaces is prevented.

Figure 8:
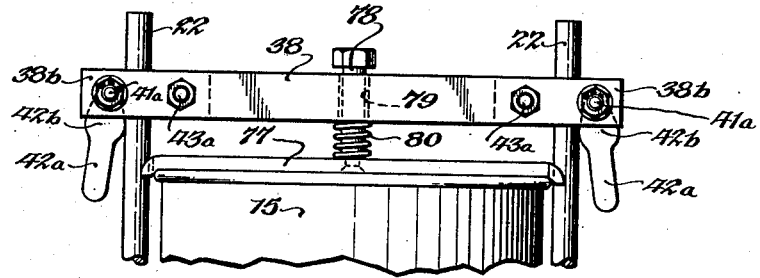
Figure 8 is a fragmentary view illustrating a modified form of cross head.
Figure 9:
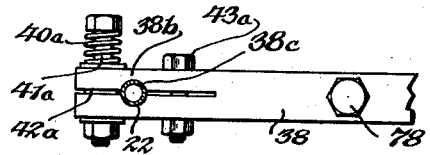
Figure 9 is a top view of an end of the cross head.

In the embodiment shown in Figure 8 the cross bar 77 by which the screen boxes 15 are secured in the apparatus is connected to the cross head 38 by a headed bolt 78. The latter fits loosely in an opening 79 and carries a spring 80. The spring is arranged between the cross head 38 and the bar 77, whereby the latter may be held against the screen boxes under the desired tension. In this construction the cross bar 77 is caused to bear with the desired pressure upon the screen boxes by adjusting the cross head 38. To this end the cross head is formed from a bar of suitable material, the said bar being formed at each end to provide co-operating fingers 38b (Figure 9). The said fingers are formed with depressions 38c which co-operate to provide passages for the rods 22. The fingers and depressions 38b and 38c respectively are so formed that the fingers resiliently engage the rod 5, the fingers being held apart by the rods. The fingers 38b, therefore, resiliently engage the rods and, owing to the functional engagement between them and the rods, hold the cross head in the desired position upon the rods. The frictional engagement between the fingers 38b and the rods 22 is preferably increased by springs 40a which are carried by bolts 41a, the springs 40a being adapted to urge the ends of the fingers toward one another. The bolts 41a carry keys 42a which are tapered at their pivoted ends as at 42b, the tapered ends of the keys co-operating with the adjacent converging sides 38d of the fingers so that by moving the key from the position shown in Figure 8 to a substantially horizontal position the fingers are spread apart to release the rods 22. After the keys 42a are operated in this manner, the cross head 38 may be readily moved along the rods to the position desired. Thereafter the said keys may be lowered to permit the fingers 38b to again engage the rods 22. In order to prevent injury to the body of the cross head, the latter is preferably reinforced adjacent the inner ends of the fingers by tie-bolts 43a.

Figure 10:
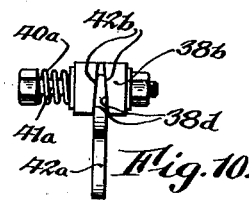
Figure 10 is an end view of the opposite end of the cross head.
Figure 11:
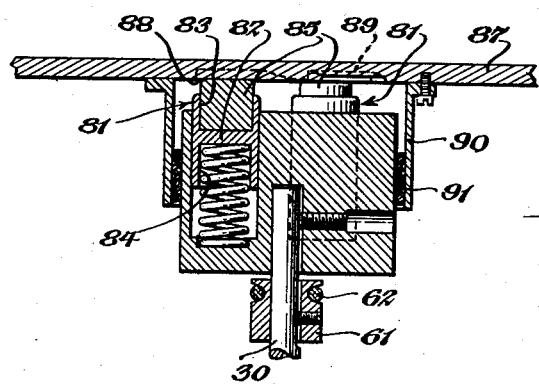
Figure 11 is a fragmentary sectional view of a modified form of vibrating mechanism.
Figure 12:
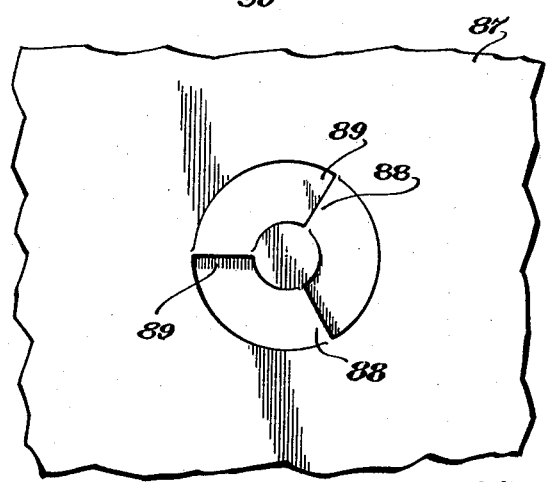
Figure 12 is a bottom plane view of a part of the said mechanism.

A modified form of vibrating mechanism is illustrated in Figures 9 and 10. In this embodiment the elements 81 are tubular in construction and are formed or provided with a partition or web 82 intermediate their ends. The said web divides the element into chambers 83 and 84, the former providing recesses for the inserts 85 while the latter are adapted to accommodate the ends of the springs 86. In this embodiment the elements 81 co-operate directly with the plate 87 upon which the screen boxes are supported. To this end the ratchet-like elevations and depressions 88 and 89 respectively are formed in the plate itself. An advantage of this construction is that economy and simplicity in construction are obtained. As in the embodiment heretofore described the plate 87 preferably carries a sleeve 90 which fits over the end of the rotor to house the elements 81. Suitable packing 91 may, if desired, be employed to seal the joint between the rotor and sleeve. In other respects the construction disclosed is similar to that described in connection with the embodiment heretofore described.

I claim as my invention:

1. Apparatus of the character described including a motor, a frame supported by said motor, a screen carried by said frame, means including said motor for vibrating said screen and means for pivotally supporting said assembly at a point between said motor and said screen so said frame and motor may be adjusted as a unit relative to said supporting means, whereby the angle of inclination of said screen may be varied at will, said motor serving to counterbalance the weight of said frame and screen.

2. Apparatus of the character described including a screen, a frame in which said screen is arranged, mechanism for vibrating said screen, said frame including uprights, a cross-head for securing said screen in said frame in co-operating relation with said vibrating mechanisms, the ends of said cross head including fingers which resiliently engage said uprights and secure said cross head against movement and means for spreading said fingers to release them from said uprights, whereby said cross head may be adjusted upon said uprights.

WILLIAM L. WETTLAUFER.